United States Patent [19]
Boesch et al.

[11] Patent Number: 6,092,053
[45] Date of Patent: Jul. 18, 2000

[54] SYSTEM AND METHOD FOR MERCHANT INVOKED ELECTRONIC COMMERCE

[75] Inventors: Brian Boesch, Oak Hill; Patrick Farrell, Falls Church, both of Va.; Elliott Light, Rockville; R. Scott Eisenberg, Bethesda, both of Md.

[73] Assignee: Cybercash, Inc., Reston, Va.

[21] Appl. No.: 09/167,873

[22] Filed: Oct. 7, 1998

[51] Int. Cl.[7] ...................................... G06F 17/60
[52] U.S. Cl. ................... 705/26; 705/10; 705/35; 705/39; 705/40; 705/78; 380/24; 380/23
[58] Field of Search .................. 705/26, 39, 74, 705/78, 10, 24, 8; 380/25, 24, 30, 23

[56] References Cited

U.S. PATENT DOCUMENTS

| | | | |
|---|---|---|---|
| 4,799,156 | 1/1989 | Shavit et al. | 364/401 |
| 5,715,314 | 2/1998 | Payne et al. | 380/24 |
| 5,724,424 | 3/1998 | Gifford | 380/24 |
| 5,960,411 | 9/1999 | Hartman et al. | 705/26 |
| 5,987,140 | 11/1999 | Rowney et al. | 380/49 |

FOREIGN PATENT DOCUMENTS

WO 97/03410  1/1997  WIPO ............... G06F 17/60

OTHER PUBLICATIONS

McKenna, Patrick, Internet Money Is Blue Not Green, PP 1, Jun. 1997.

Bank Technology News, CyberCash Applies A Digital Makeover, PP 1–2, Oct. 1998.

Moeller Michael, IBM takes charge of E–commerce, PC Week, PP 1–2, Apr. 1996.

Freeman Eva, How to move e–cash around the Internet, PP 1–2, Jun. 1997.

*Primary Examiner*—James P. Trammell
*Assistant Examiner*—Mussie K. Tesfamariam
*Attorney, Agent, or Firm*—Roberts, Abokhair & Mardula

[57] ABSTRACT

A system and method for merchant invoked electronic commerce allowing consumers to purchase items over a network and merchants to receive payment information relating to the purchases. The system includes a server having software which gathers the purchasing information from a consumer to complete a purchasing transaction over a network. The system has a consumer data structure that stores purchasing information for registered consumers. The software is able to access the consumer data structure and enter the consumer's purchasing information during subsequent purchases. Having the software obtain and enter the consumer's purchasing information, the consumer does not have to enter the same information every time they purchase an item over the network. In alternate embodiments, the same technology can be applied to other arenas where a user may have to enter the same repetitive information.

123 Claims, 5 Drawing Sheets

SYSTEM AND METHOD FOR MERCHANT INVOKED ELECTRONIC COMMERCE

FIELD OF THE INVENTION

This invention relates generally to a method and system where certain information pertaining to a consumer is stored on a server and is provided to a third party at the request of the consumer. More particularly, the present invention relates to a method and system where certain consumer information is stored on a server and is provided to a merchant thereby allowing the consumer to use an electronic payment system to purchase a product or service over a network in an easy and safe manner.

BACKGROUND OF THE INVENTION

With the emergence of the Internet, consumers and merchants are using the Internet to engage in electronic commerce. To purchase products over the Internet, consumers typically prefer to use electronic payment services. Such services offer a variety of features, including security, privacy, anonymity, and access to transaction histories. The basic model for such services requires a communication link between a consumer's computer and a merchant's computer, and a link between the merchant's computer and a payment server. To use such a payment service, consumers are required to install large amounts of software (commonly called "wallets") onto their computer for the purpose of storing an electronic representation of money or for identifying sources of payments. An example of electronic payment services include such services as SET Specification, HP, CyberCash, IBM, OTP, etc).

If a consumer installs the software for a wallet onto the consumer's computer, the consumer typically has to update the wallet software to correct bugs, to add features, or to improve service performance. Further, the wallet software is accessible only on the computer on which the wallet software is installed. As a result, the consumer must install a copy of the wallet software onto each computer from which the consumer desires to access the payment service.

Once the wallet from a payment service is installed, the consumer may be limited as to where the consumer can shop because of the proprietary nature of the electronic payment service business. Typically a consumer can only purchase a product or service from a merchant who accepts payments from the same payment service. As a result, merchants may opt to use a plethora of payment services thereby raising costs and requiring merchants to manage a variety of software programs.

Present payment services require consumers to go through a large number of steps to complete a transaction. Research has shown that the more steps a consumer is required to take to complete a transaction, the more likely that the consumer will terminate the purchase process prior to completing the purchase. Experience has also shown that, as impressive as wallets may be from a theoretical perspective, consumers don't like them and don't use them. As a consequence, transactions are performed over the Internet in non-secure environments or in inefficient manners, or both.

In order to avoid such problems, some inventions have created new types of systems. One such system requires consumers to use a payment server which sends an access message to a merchant thereby causing the desired product to be sent to the consumer. The access messages include such information as a product identifier and a message authenticator. The message identifier is necessary to identify which product is to be sent and the message authenticator is necessary to ensure that the access message is legitimate. Once the payment server authorizes the transaction, an access message is sent to the merchant. However, these type of systems go against the current mode of operation where merchants determine the authorization of a transaction. Merchants typically want to control the authorization of a transaction in the same manner as they are accustomed to. Presently, if a consumer purchases an item at a store, the merchant controls the authorization of the transaction.

Therefore, a need exists for a system that allows a consumer to send payment information to a merchant's computer over the Internet in a manner that offers security, allows access from any computer that has access to the Internet, delivers payment information to a merchant's computer regardless of the payment system that the merchant uses to process transactions, and allows system upgrades without dependency on the consumers.

SUMMARY OF THE INVENTION

It is therefore an object of the present invention to reduce the number of steps a consumer is required to perform in order to purchase a product over any network.

A further object of the present invention is to reduce the number of steps a consumer is required to perform in order to purchase a product over the Internet.

A further object of the present invention is to eliminate the need for consumers to leave a merchant's site to acquire an electronic form of payment.

A further object of the present invention is to eliminate wallet software which is permanently stored on the consumer's computers.

A further object of the present invention is to create a consumer information server for storing wallet software, that can be accessed easily and transparently by a consumer.

A further object of the present invention is to allow the system administrator of the consumer information server to upgrade the software on such server at any time.

A further object of the present invention is to allow flexibility in providing new or modified services to the consumers via upgrades to software stored on the consumer information server.

A further object of the present invention is to reduce the number of payment parameters consumers are required to fill in when purchasing products over a network.

A further object of the present invention is to allow a consumer to conduct transactions using data stored on the consumer information server from any computer connected to the network on which the consumer information server resides.

A further object of the present invention is to allow consumer information to be provided to merchants using payment systems from various service providers.

A further object of the present invention is to use the architecture of the consumer information server to aid the consumer in distributing all manner of information, not just purchase/money information, to a variety of recipients when those recipients are to receive essentially the same information from one recipient to the next.

A further object of the present invention is to provide a mechanism for direct marketing to consumer wallet holders immediately before, during, or after completion of a transaction using a wallet.

The present invention is a system for presenting a consumer's purchasing information to a merchant's computer to allow a sale of goods or services to be consummated. The system comprises a computer associated with a consumer (the "consumer's computer"), a computer associated with a merchant (the "merchant's computer") and a server (the "consumer information server" or "CIS") on which the necessary and desirable information about the consumer is stored. The consumer's computer, the merchant's computer, and the CIS are connected to a network, such as the Internet, and communicate using communication protocols. The consumer's computer operates Web browser software (the "consumer's browser"). The merchant's computer operates as a web server, provides transaction processing, and performs other functions. The merchant's computer may be a single device, or may, at the merchant's discretion comprise a number devices which may or may not be co-located. The merchant's computer also operates software ("client software") that communicates with the CIS. The CIS operates CIS software which provides access to information stored in various databases, logs, and/or datastructures.

The present invention allows consumers to purchase products over a network and allows merchants to receive payment information relating to that purchase. During the shopping process, a consumer browses a merchant's Web site. The merchant's Web site includes goods and/or services (herein, "item") for sale. The merchant's Web site also operates client software. When the consumer requests a merchant's offer, the client software sends a browser readable file and the merchant's offer to the consumer's browser on the consumer's computer. The merchant's offer comprises in part a transaction number which is not representative of the product code or description. The browser readable file includes an address to the merchant's Web page and instructions that instruct the consumer's browser to communicate with the CIS software. The merchant's offer passes through the consumer's computer to the CIS software.

The CIS software returns a message to the consumer's browser and instructs the consumer's browser to display a graphic within an area reserved for the wallet within the merchant's Web page. The content of this graphic depends on whether or not the consumer is known to the CIS software.

If the consumer is known to the CIS software, the CIS software takes information contained in the merchant's offer, formats the information to allow the consumer's browser to display the merchant's offer, and sends the merchant's offer to the consumer's computer where the merchant's offer is displayed by the consumer's browser within the area reserved for the wallet within the merchant's Web page. The consumer is prompted to decide whether or not to purchase the item. Typically, this communication occurs by the consumer clicking on an object resulting in a message being communicated to the CIS.

If the consumer elects to purchase the item, the CIS software forwards information to the merchant's computer. The information includes information from the merchant's offer and the consumer's personal information (e.g., credit card number, address, shipping address) which is stored on the CIS. The merchant's computer then uses the information to complete the transaction.

If the consumer is unknown to the CIS software, the CIS software sends a form to the consumer's computer which is displayed within the area reserved for the wallet within the merchant's Web page. The form prompts the consumer to provide the purchasing information to complete the transaction. Once the consumer provides sufficient information to complete the transaction, the CIS software prompts the consumer to purchase the item. If the consumer elects to purchase the item, then the consumer is prompted to elect to have the information retained on the CIS for future use (the process herein referred to as "registration"). If the consumer answers "no", then the information is stored in a temporary data structure. Information stored in the temporary data structure is retained for a set amount of time and is not available for reuse by the consumer. If the consumer answers "yes", then the information pertaining to the consumer is stored in a data structure intended for the retention and future use by the consumer.

If the consumer elects to register with the CIS software, during the registration process, the consumer's browser is sent a browser identifier. In the preferred embodiment, the browser identifier is a cookie. The browser identifier contains data which is crypto graphically protected to enhance security. The browser identifier allows the CIS software to identify the consumer's browser and permits a customer to authenticate himself or herself, thereby permitting the CIS software to use the consumer's stored information in future transactions.

The system also allows consumers who are registered on a different browser to authorize the CIS software to use the consumer's stored information. This situation occurs when the CIS software cannot identify the browser identifier because there is no browser identifier in the consumer's browser or the browser identifier cannot be used to identify the particular consumer using the consumer's browser.

Since the system establishes communication links between the merchant's computer and the CIS, the system can be optimized in several respects. For example, the price of an item may be affected by the location to which the item is to be shipped, the method of shipping, and by tax obligations. The CIS software communicates information pertaining to the consumer to the merchant's computer permitting the merchant's computer to determine a "final" price based on the consumer's information, i.e., shipping address and/or preferences.

Another example of optimization is the ability of the CIS software to present a merchant's brand or other "brand" to the consumer's browser. The CIS software can also associate a consumer with an identification code that can be presented to the merchant's computer, thus allowing the merchant to "recognize" a consumer and provide customer-specific messages, displays, and offers. The CIS software can tailor its communication with the consumer's computer in accordance with a profile created by the CIS software. The profile is based upon preferences chosen by the consumer or created by the CIS software based on the consumer's behavior, from preferences chosen by the merchant, by a branding party, or the like.

With respect to consumers, the system is optimized to provide all of the purchasing information to the consumer thereby allowing the consumer to verify the information and make a purchase decision without further purchasing information input from the consumer. The system can also establish a dialogue between the consumer's computer and the CIS to permit the consumer to select from options such as which credit card to use, the shipping address, and the shipping means.

DETAILED DESCRIPTION OF PREFERRED EMBODIMENT

For the purpose of this application, the term software is deemed to include instructions.

Figure 1:
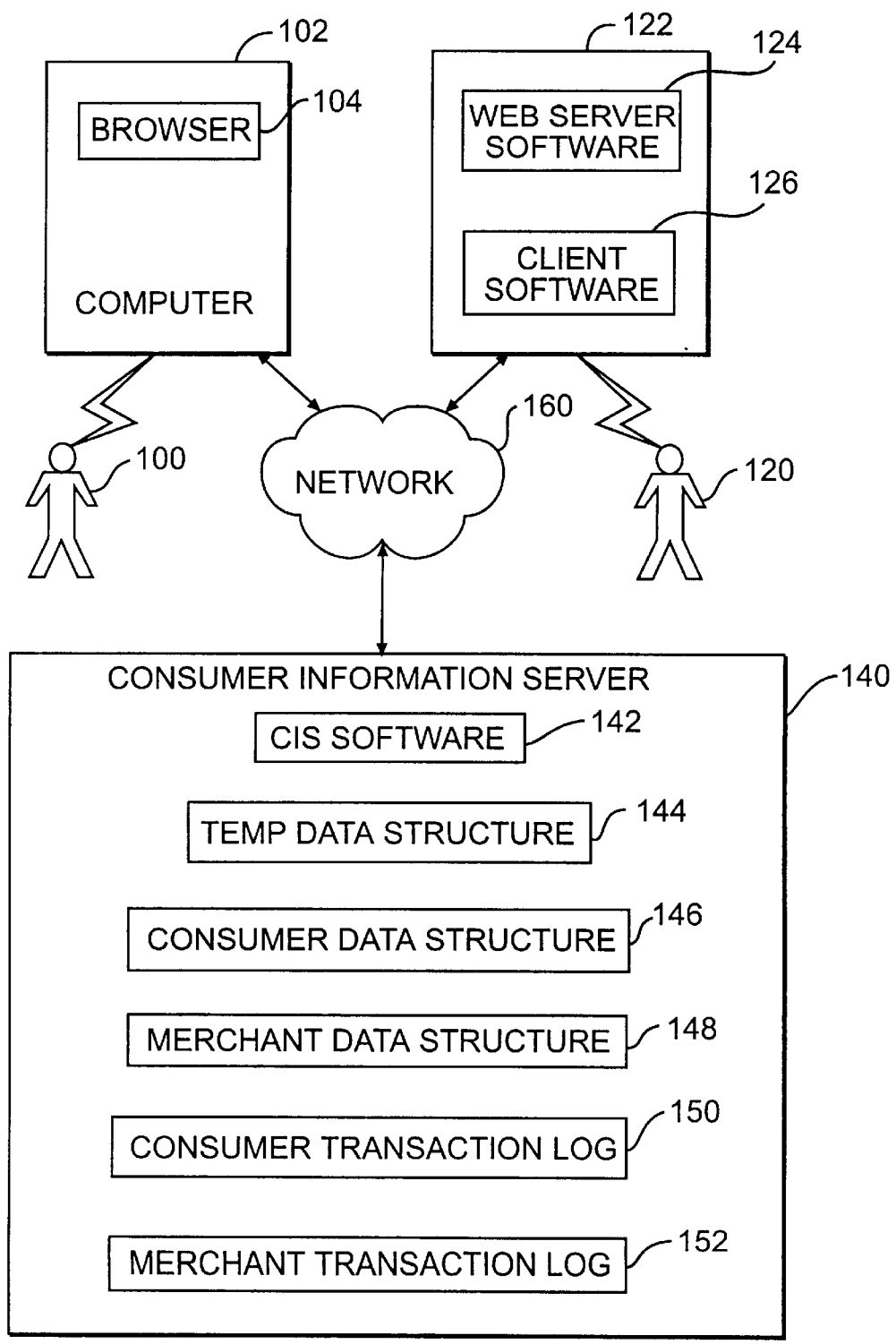
FIG. 1 illustrates the elements of the present invention.

Referring to FIG. 1, the elements of the present invention are illustrated. The present invention allows consumer 100 to purchase a product or service (hereinafter an "item") over network 160 and allows merchant 104 to receive payment information relating to the transaction.

To purchase an item, consumer 100 uses consumer computer 102. Consumer computer 102 operates consumer's Web browser (the "consumer's browser") 104. Consumer's browser 104 allows consumer 100 to download and display Web pages.

To receive payment information relating to the purchase, merchant 120 uses merchant computer 122. Merchant computer 122 operates Web server software 124 and client software 126. Web server software 124 displays a merchant's Web pages. Client software 126 allows merchant 104 to communicate with the Consumer Information Server (the "CIS") 140.

In the preferred embodiment, CIS 140 comprises CIS software 142 which gathers and stores the purchasing information to complete a purchasing transaction over common network 160, temporary data structure 144 which stores consumer information for a limited amount of time and cannot be used in future transactions, consumer data structure 146 which stores consumer information which can be used in future transactions, merchant data structure 148 which stores information pertaining to different merchants, consumer transaction log 150 which stores information pertaining to the transactions for registered consumers, and merchant transaction log 152 which stores information pertaining to transactions for registered and non-registered consumers.

Consumer computer 102, merchant computer 122, and CIS 140 are connected to common network 160. The present invention can operate over various types of common networks both wired and wireless. The present invention can operate over the Internet, intranet, LANS, and WANS however this list should not be construed as a limitation. In the preferred embodiment, the common network is the Internet.

CIS software 142 gathers and stores the purchasing information to complete a purchasing transaction over common network 160. CIS software 142 gathers the purchasing information directly from consumer 100, from consumer data structure 146 or from both. If consumer 100 has not previously registered with CIS software 142, consumer 100 is treated as a non-registered consumer. For non-registered consumers, CIS software 142 gathers the purchasing information by prompting consumer 100 for the information. If consumer 100 is a registered consumer, i.e., a consumer who previously registered with CIS software 142, then CIS software 142 gathers the purchasing information from consumer data structure 146. If additional purchasing information is needed, CIS software 142 prompts consumer 100 for the information.

Temporary data structure 144 stores label-value pairs relating to a particular interaction between consumer 100 and merchant 120. If consumer 100 is not known to CIS software 142 (discussed below), consumer 100 is prompted for purchasing information to complete the transaction. The purchasing information can include the customer's name, billing address, shipping address, and credit card number, however this information should not be construed as a limitation. In the preferred embodiment, the purchasing information is stored in temporary data structure 144 which is located at CIS 140. In alternative embodiments, the purchasing information can be stored on a dedicated server or a shared server.

If consumer 100 declines to have purchasing information stored at CIS 140, the purchasing information remains in temporary data structure 144 for a set period of time. The purchasing information in temporary data structure 144 is not available to consumer 100 for future transactions. If consumer 100 elects to have purchasing information stored at CIS 140, the purchasing information in temporary data structure 144 will be saved for subsequent use in consumer data structure 146.

Consumer data structure 146 stores label-value pairs relating to consumers, including consumer 100, that have completed the registration process with the operator of CIS 140. The label-value pairs in consumer data structure 146 represent information that is necessary, and may include information that is useful to complete a transaction. The purchasing information can include the customer's name, billing address, shipping address, and credit card number, however this information should not be construed as a limitation. The useful information can also include email, telephone numbers, facsimile numbers, and user preference data (regarding shipping address, shipping method, and related data), however this information should not be construed as a limitation.

Merchant data structure 148 stores label-value pairs relating to merchants, including merchant 120, that have completed the registration process with the operator of CIS 140. The label-value pairs in merchant data structure 148 represent information that is necessary to identify merchant 120 and merchant computer 122. This information includes contact information, merchant identification number, network location(s) for the merchant computer 122, payment card type, accepted currencies, and payment methods (e.g., electronic check, micropayments), however this information should not be construed as a limitation.

Consumer transaction log 150 stores label-value pairs relating to transactions performed by registered consumers. Merchant transaction log 152 stores label-value pairs relating to transactions performed by registered and non-registered consumers, including consumer 100. The operator of CIS software 142 can allow consumers and merchants access to the information contained in their respective data structures as deemed necessary. For instance, consumer 100 can be given a summary of the consumer's transactions over a period of time. Merchant 120 can be given a summary of the merchant's transactions over a period of time.

Figure 2A:
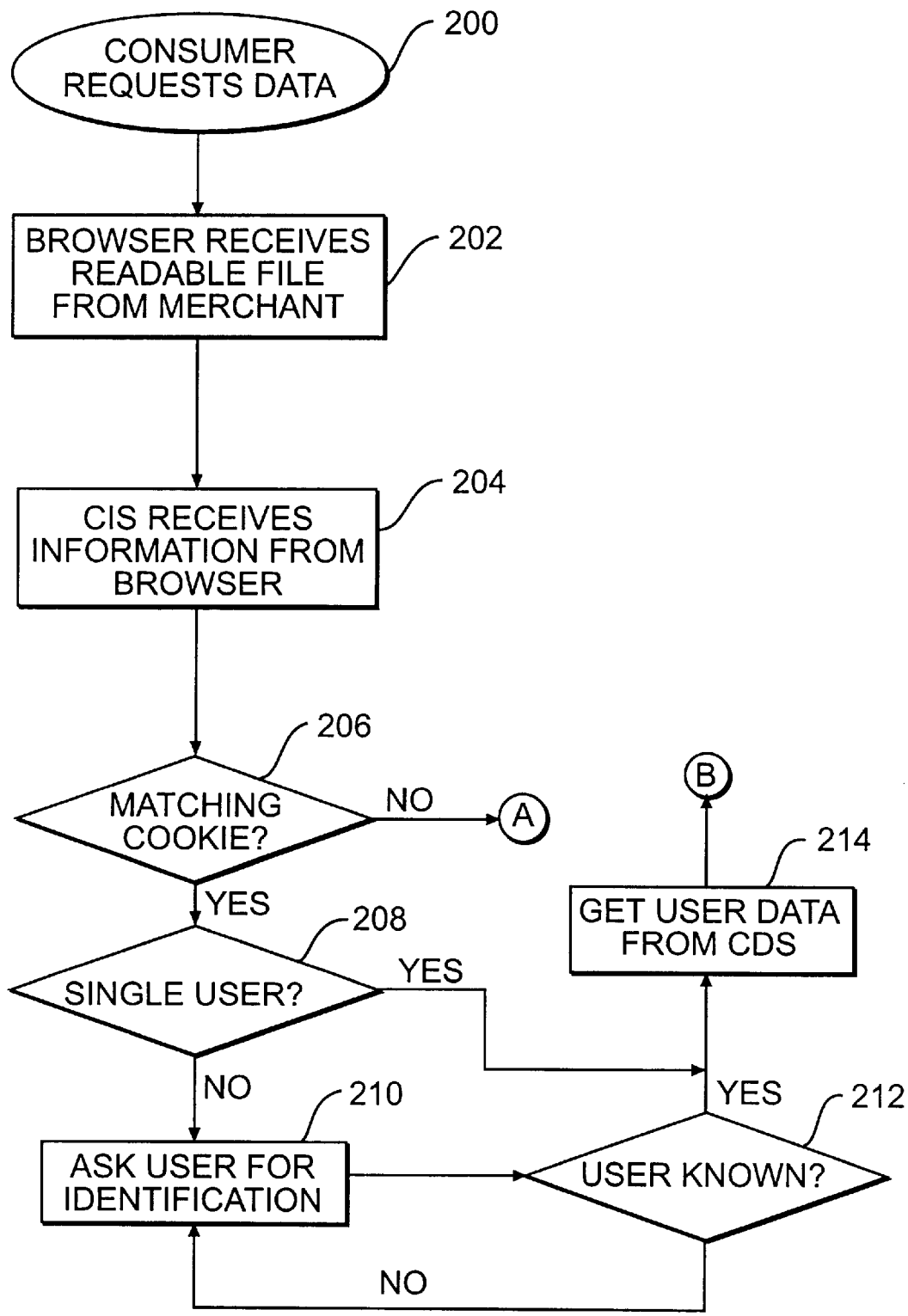
FIG. 2A illustrates the process of purchasing an item over a network.

Referring to FIGS. 2A, the process of purchasing an item over a network is illustrated. The following process is the preferred embodiment of the present invention, in alternate embodiments, similar processes can occur in different orders. In the preferred embodiment, the process starts with a consumer requesting a merchant's offer 200 from a merchant. In response to the consumer's request, the merchant's computer responds by sending a browser readable file and the merchant's offer to the consumer's computer 202. The consumer's browser processes the browser readable file and sends the merchant's offer and a message to the CIS 204.

The merchant's offer includes the following information, however this information should not be considered a limitation: merchant identifier, price of the item, a form of digital signature of the merchant, a final price indicator, and a transaction number. The merchant identifier identifies the merchant who is offering the item for sale. The price of the item is cost to purchase the item. A digital signature of the merchant is used to ensure the validity of the offer. The final price indicator is used to indicate whether the final cost for the item is affected by the consumer's shipping address and/or shipping preference. The transaction number is used for tracking purposes. The transaction number does not contain any product identifying information. The transaction number acts as an identifier for identifying a transaction.

The message sent from the consumer's browser to the CIS indicates whether the browser contains a browser identifier. In the preferred embodiment, the browser identifier is a cookie. A browser identifier identifies the consumer browser on a specific consumer computer. The CIS software receives and processes the message to determine if the consumer's browser contains an identifier which identifies a consumer that matches a data entry in a file in the consumer data structure of the CIS 206. The CIS software determines whether a single user or multiple users have used the consumer's browser 208 by checking the consumer data structure. If the CIS software identifies more than one user, the CIS software will select a user based on a selection criteria generated by the operator of the CIS. If the user selected by the CIS software is not the current user and the current user objects, then the consumer is asked for identification 210. If the current user does not object, as described below, the current user cannot complete a transaction unless the current user enters the proper passphrase which belongs to the selected user. This process requires the CIS software to send a message to the consumer's computer prompting the consumer to provide information to identify the consumer. In the preferred embodiment, the CIS software prompts the consumer for the consumer's identification number, email address, and a passphrase. The consumer's identification number, email address, and passphrase are used to authenticate the consumer. These entries were provided by the consumer during the registration process which is discussed below. In alternate embodiments, the consumer can be prompted for different information to identify the consumer.

The consumer's response is sent back to the CIS where the CIS software then determines if the consumer is known to the CIS software 212. A known or registered consumer is a consumer who has previously registered with the CIS software and whose information matches information supplied by the consumer during a prior registration. If the CIS software determines that the information provided by the consumer is insufficient to identify the consumer, then the CIS software prompts the consumer for the same information again. The operator of the CIS can set the number of iterations that the consumer is prompted for the consumer's identity. If the consumer's response matches the information the consumer supplied during registration, then the CIS software accesses and gathers the consumer's information which is stored in the consumer data structure (CDS) 214.

In an alternative embodiment, the system can include a plurality of CISs. In such a system, the consumer would be registered on one of the CISs. If the CIS software determines that the information provided by the consumer does not match the information on the CIS the consumer is connected to, then the CIS software will communicate with the other CISs to identify the consumer and obtain the consumer's information.

If the consumer's browser does not contain a browser identifier or if the information the consumer provided does not properly identify the consumer, i.e., the consumer is not found in a file in the consumer data structure of the CIS, the CIS software prompts the consumer for the purchasing information 216. This is accomplished by the CIS software sending a form to the consumer's browser. In an alternative embodiment, the consumer is prompted for the purchasing information using a plurality of forms. The form or forms prompts the consumer to provide the purchasing information to complete the transaction. The purchasing information includes the consumer's name, address, shipping address, and credit card number, however this list should not be construed as a limitation. In the preferred embodiment, the consumer has the option of indicating that the consumer is a registered consumer.

The consumer's response or responses are sent to the CIS 218. The CIS software then determines if the consumer claims to be a registered consumer 220. If the consumer claims to be a registered consumer, then the CIS software prompts the consumer for proof 222. In the preferred embodiment, this is accomplished by the CIS software prompting the consumer for the consumer's identification number, email address, and a passphrase. The consumer's identification number, email address, and passphrase are used to authenticate the consumer. These entries were provided by the consumer during the registration process which is discussed below. In alternate embodiments, the consumer can be prompted for different information to identify the consumer.

The consumer's response for proof is sent back to the CIS where the CIS software then determines if the consumer is a registered consumer 224. Again, a registered consumer is a consumer who has previously registered with the CIS software and whose information supplied by the consumer matches information supplied by the consumer during a prior registration.

If the CIS software determines that the information provided by the consumer matches the information the consumer supplied during registration, then the CIS software accesses and gathers the consumer's information which is stored in the consumer data structure (CDS) 214.

Figure 2B:
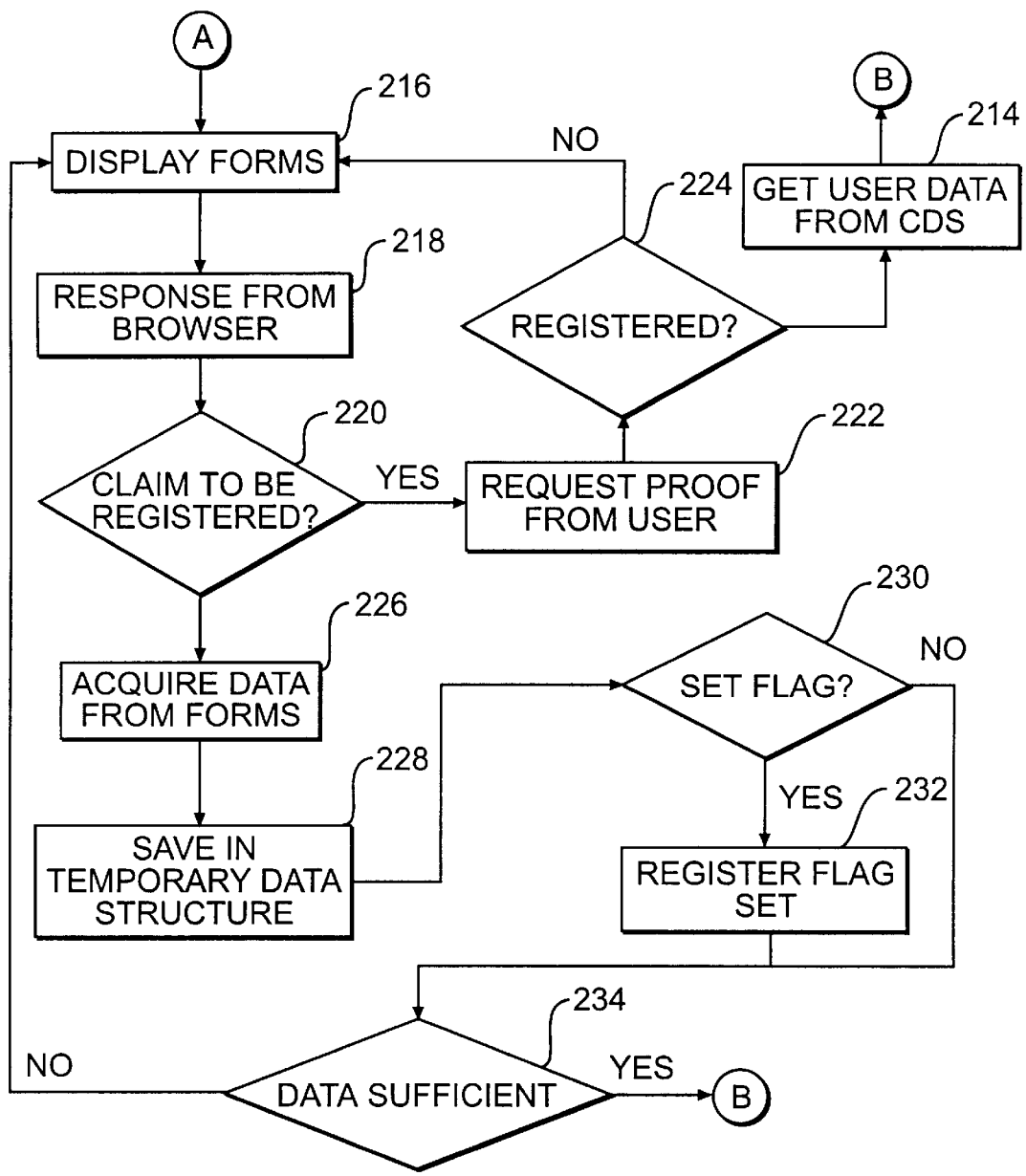
FIG. 2B illustrates the process of purchasing an item over a network (continued).

Referring to FIG. 2B, if the CIS software determines that the information provided by the consumer is insufficient to identify the consumer, then the CIS software prompts the consumer for the purchasing information to complete the transaction 216.

If the consumer does not claim to be registered then the CIS software acquires the consumer's data from the forms 226. In addition, the consumer's response can be sent to the merchant to determine whether the item can be sold to that consumer. For instance, a consumer in one state may not be able to purchase a firearm if the law governing the consumer or merchant does not permit such a transaction. In yet another embodiment, the consumer response to one question can lead to another question which requires another form. For instance, if the consumer requests overnight shipping, the CIS software can prompt the consumer to select the overnight shipping service.

The CIS software stores the data in a temporary data structure 228. The data is evaluated to determine if the consumer elected to register with the CIS 230. If the consumer elects to become a registered consumer, then the CIS software sets the flag 232. If the consumer does not elect to become a registered consumer then the flag is not set. Registration allows the CIS software to access the consumer's information which was previously stored in the consumer data structure. The information acquired from the forms is evaluated to determine if the information from the consumer is sufficient to complete the purchase transaction 234. This step includes the CIS software accessing the merchant data structure using the merchant identifier to ensure that the consumer's purchasing information is in proper order, i.e., to check that the consumer's credit card accepted by the merchant. If the information is not sufficient, the consumer is prompted for the information again 216. The operator of the CIS can set the number of iterations that the consumer is prompted for the information.

Figure 2C:
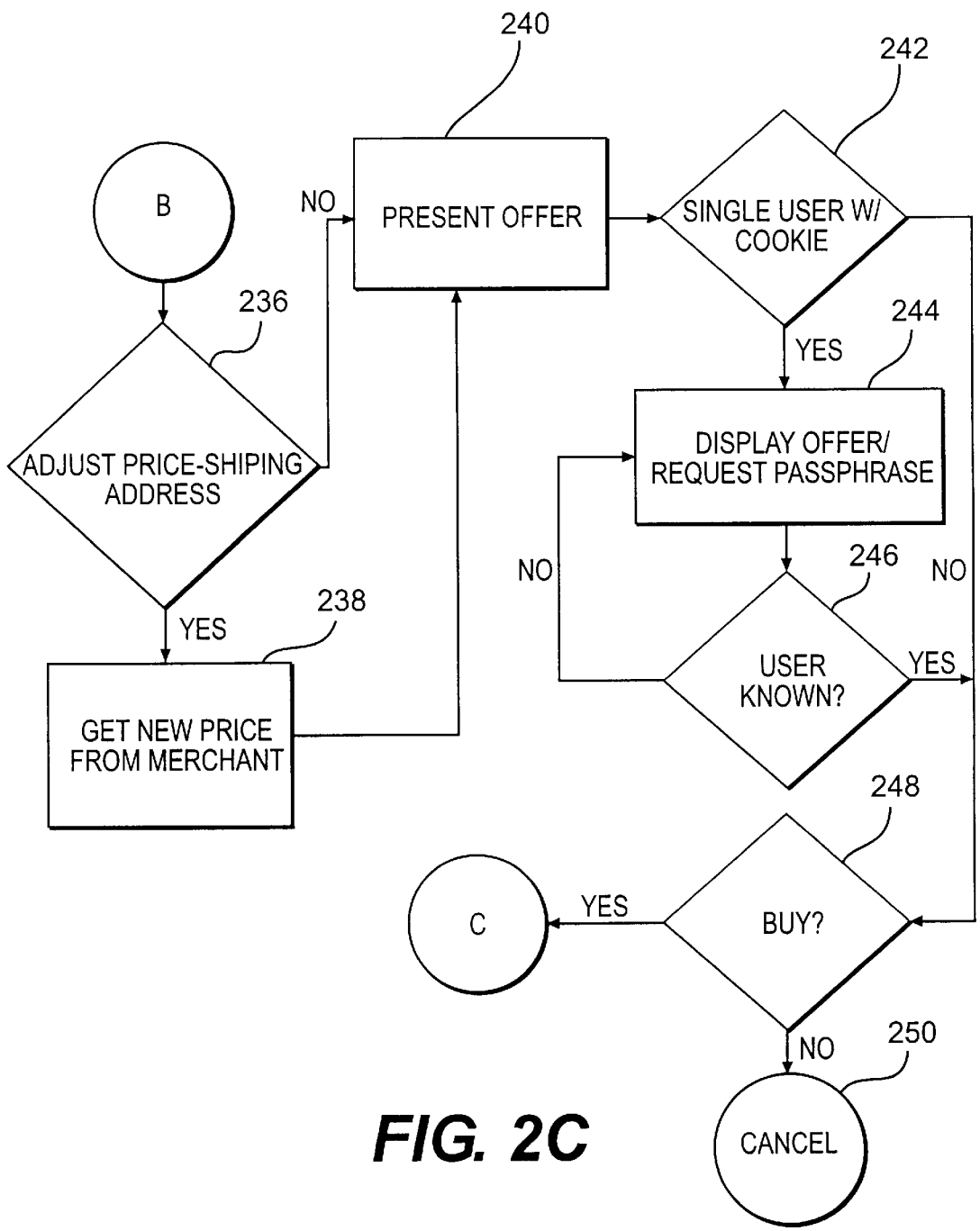
FIG. 2C illustrates the process of purchasing an item over a network (continued).

Referring to FIG. 2C, once the CIS software determines that the consumer's information is sufficient to complete the purchase transaction, the CIS software reads the final price indicator in the merchant's offer to determine if the price needs to be adjusted due to the consumer's shipping address and/or shipping preference 236. If the price is affected by the consumer's shipping address and/or shipping preference, then the CIS software communicates the required information to the merchant to calculate a new price based on the consumer's shipping address 238. In the preferred embodiment, the CIS software only sends the city, state, country, and mail code information to the merchant's computer. This information is limited to permit the revised price calculation without having to disclose personal information relating to the consumer.

In alternate embodiments, the consumer's address can be the consumer's email address or a facsimile number.

Once the merchant responds with the revised price or if the price was not affected, the CIS software presents the merchant's offer to the consumer 240. The merchant's offer is displayed to the consumer in the area reserved for the wallet. The CIS software then determines if the consumer needs to enter a passphrase. If the consumer is a registered consumer who has not gone through the authentication process yet, then the consumer is required to enter the proper passphrase for the consumer identified with the browser identifier (cookie) 242. The offer is then augmented with a prompt for the user to enter the consumer's passphrase 244. The CIS software evaluates the entered passphrase against data held in the consumer data structure 246 to determine if the consumer is known (registered) by the CIS software. If the passphrase does not match, then the consumer is prompted for the correct passphrase 244. The operator of the CIS can set the number of iterations that the consumer is prompted for a correct passphrase to avoid multiple fraudulent attempts to access information.

Once the consumer enters a correct passphrase or if there was no browser identifier for the consumer, the consumer is presented with a buy decision 248. The consumer has several options available at this step: the consumer can elect to buy the item, change the consumer's information and buy the item, or cancel the transaction. If the consumer elects to change the consumer's information, the consumer must still decide to either buy the item or cancel the transaction after changing the information. If the consumer declines to purchase the item, then the transaction is canceled, then the information held in the temporary data structure is deleted, the dialogue ends and the transaction is terminated 250.

The consumer also has the option of changing the consumer's information. The consumer may wish to change such information for such reasons as the consumer does not agree with the selection by the CIS software or the information contains an error. For instance, if the consumer wishes to change the shipping address, the consumer can enter a new shipping address. In some instances, the consumer can have a plurality of possible entries into the same information block with a preferred entry. In such a situation, the CIS software chooses the preferred information to enter into the information block. The CIS software chooses the information via any selection process known in the art, such as most popular, last used, first used, etc. However, the CIS software cannot enter information into an information block if the merchant will not allow such an entry. For instance, a merchant may only accept the ACME credit card and the consumer has not previously used an ACME credit card to purchase an item using the present invention. In such a situation the CIS software prompts the consumer to provide an acceptable form of payment. Information options are available to the consumer in the form of directory of addresses, shippers, shipping methods, credit cards, and other information options.

Figure 2D:
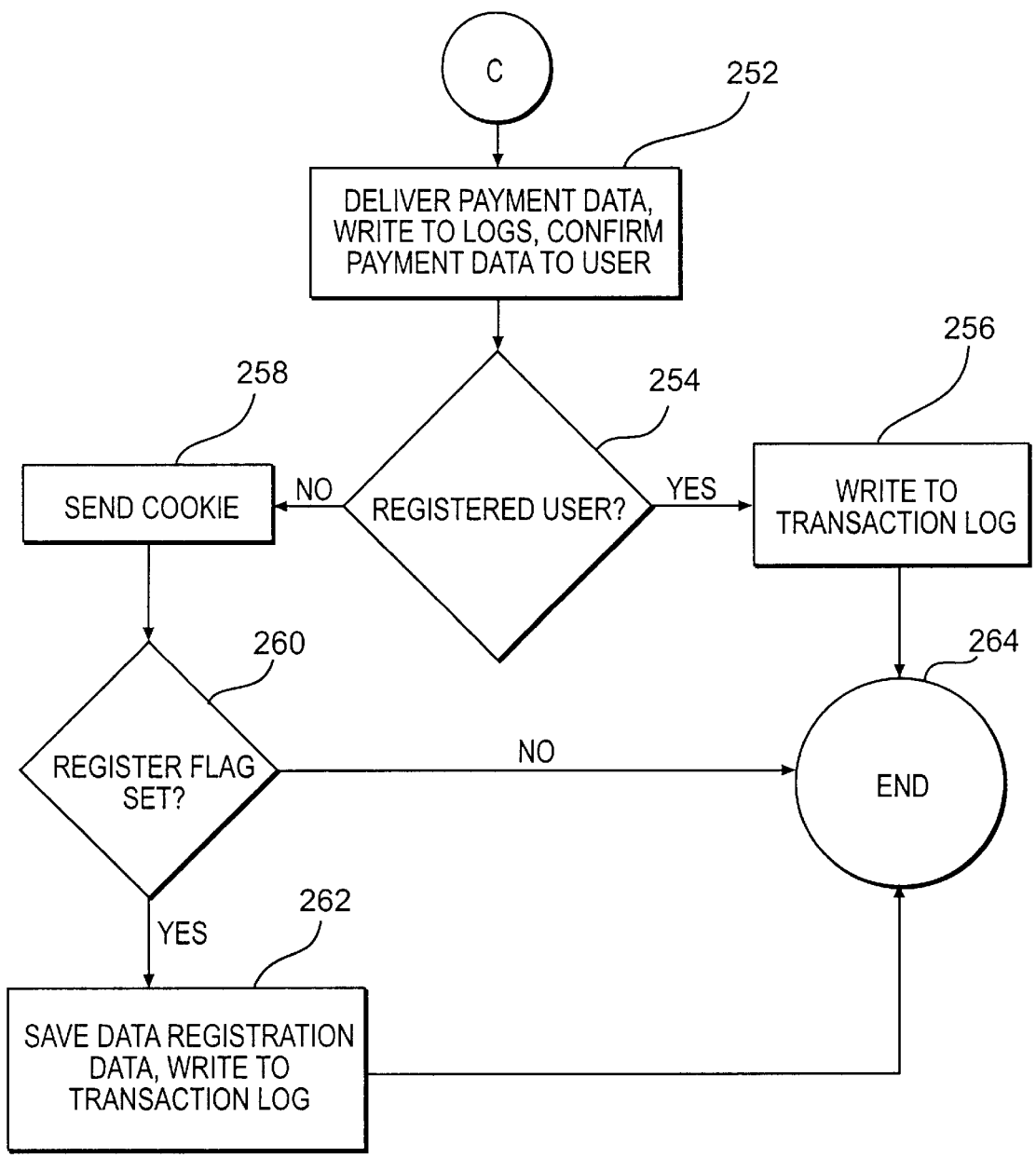
FIG. 2D illustrates the process of purchasing an item over a network (continued).

Referring to FIG. 2D, if the consumer elects to purchase the item, then the information regarding the transaction is delivered to the merchant's computer, information is written to the merchant transaction log, and a message confirming the transaction is sent to the consumer's computer 252. The CIS software then determines if the consumer is registered 254. If the consumer is a registered consumer, then the information regarding the transaction is written to the consumer transaction log 256.

If the consumer is non-registered consumer, i.e, not known to the CIS software, then a browser identifier (i.e., a cookie) is sent to consumer's computer 258 and CIS software determines if the register flag was set 260. If the register flag is set, then the information stored in the temporary data structure pertaining to the consumer is transferred to the consumer data structure for subsequent uses, the consumer is prompted for a passphrase, and the CIS software saves the transaction data to the consumer transaction log 262. If the register flag is not set, the transaction data remains in the temporary data structure until it is discarded but is unavailable for future use. The transaction process ends 264.

In addition to registering during a purchasing transaction, a consumer can also register by accessing the consumer information server and entering the purchasing information to become a registered consumer in advance of any purchase.

Although the above description is directed at purchasing an item over the Internet, the same concept of distribution of information can be applied to other areas. In an alternative embodiment, the consumer can be an accessee, the merchant can be an accessor, the consumer information server can be an information server (IS), the consumer data structure can be an accessee data structure, the merchant data structure can be an accessor data structure, the consumer transaction log can be an accessee transaction log, and the merchant transaction log can be an accessor transaction log. The accessee can authorize the software on the IS to provide information to an accessor. For instance, the accessee can be a prospective applicant applying for admission into an educational institution such as a college or a university. In this case, the prospective applicant stores an entire range of information on the IS where the information is relevant to the initial screening for college applications. For example, SAT scores, addresses for references, personal information, responses to questions of desired major or subject area would be information stored on the IS. This information could then be supplied to colleges whose Web sites could access the IS for the desired information.

In yet another embodiment, the accessee can be a potential mortgage borrower, the accessor can be a mortgage lender, and the information stored on the IS can be the accessee's financial information. The accessee can authorize the software on the IS to provide the accessor the information stored on the IS to allow the accessee to apply for a mortgage or to get a quote. Again, the accessee would provide a wide range of data necessary for the mortgage application process. The information can include the accessee's credit reports, bank statements, employment record, and other credit related information.

In all of these different type of embodiments, the communications between the different parties can be encrypted in any manner known in the art. In addition, some of the communications can be accomplished in different manners. For example, in an alternate embodiment of the preferred embodiment, communications between the CIS and the merchant computer can occur using a separate communication link. The communication link can be a direct link between the merchant and the CIS. Using this separate link can ensure against unauthorized transactions.

Although the present invention has been described in detail for purpose of illustration, it is understood that such detail is solely for that purpose, and variations can be made therein by those skilled in the art without departing from the scope of the invention. The preceding descriptions of the operations of the present invention are merely illustrative. In various embodiments of the disclosed inventions operational steps may be added, eliminated, performed in parallel or performed in a differing order. The apparatus and process of the present invention is defined by the following claims.

We claim:

1. A system for merchant invoked electronic commerce comprising:
   a network;
   at least one consumer computer associated with at least one consumer and connected to the network, wherein the at least one consumer computer further comprises a web browser for accessing and communicating over the network;
   at least one merchant computer associated with at least one merchant and connected to the network, wherein the at least one merchant computer further comprises web server software for hosting a web page and for executing client software for allowing the at least one merchant to send and receive information over the network; and
   at least one consumer information server connected to the at least one consumer computer via the network and to the at least one merchant computer via the network, wherein the at least one consumer information server fer comprises consumer information server software, and wherein the client software further comprises instructions for forwarding a merchant's offer to the at least one consumer information server via the consumer's web browser and the consumer information server software further comprises instructions for gathering purchasing information to complete a purchasing transaction.

2. The system in accordance with claim 1, wherein the consumer information server further comprises instructions to send the purchasing information to the at least one merchant computer.

3. The system in accordance with claim 1, wherein the network is selected from group consisting of the Internet, intranet, local area networks (LANS), and wide area networks (WANS).

4. The system in accordance with claim 1, wherein the client software further comprises instructions for instructing the consumer web browser to forward the merchant's offer to the consumer information server and to send a message to the consumer information server indicating whether a browser identifier is present in the consumer's web browser, and wherein the presence of a browser identifier indicates whether the consumer's web browser was previously used in conjunction with the system.

5. The system in accordance with claim 4, wherein the browser identifier is a cookie.

6. The system in accordance with claim 4, further comprising a consumer data structure which further comprises information pertaining to previous purchasing transactions by at least one registered consumer, and wherein a registered consumer is a consumer who has previously registered with the system.

7. The system in accordance with claim 6, wherein the consumer information server further comprises storage for storing the consumer data structure.

8. The system in accordance with claim 6, wherein the system further comprises at least one server for storing the consumer data structure.

9. The system in accordance with claim 4, wherein the system further comprises a merchant data structure which further comprises label-value pairs which represent merchant information that is necessary to identify the merchant and the merchant computer.

10. The system in accordance with claim 9, wherein the merchant information further comprises contact information, merchant identification number, at least one network location for the merchant computer, accepted payment card types, accepted currencies, and accepted payment methods.

11. The system in accordance with claim 9, wherein the consumer information server further comprises storage for storing the merchant data structure.

12. The system in accordance with claim 9, wherein the system further comprises at least one server for storing the merchant data structure.

13. The system in accordance with claim 4, further comprising:
   a consumer data structure which further comprises information pertaining to previous purchasing transactions by at least one registered consumer, wherein a registered consumer is a consumer who has previously registered with the system and
   a merchant data structure which further comprises label-value pairs which represent merchant information that is necessary to identify the merchant and the merchant computer.

14. The system in accordance with claim 13, wherein the consumer information server software further comprises instructions to select a consumer if the browser identifier identifies one or more registered consumers who have used the consumer's web browser in conjunction with the system.

15. The system in accordance with claim 14, wherein the consumer information server software further comprises instructions to gather the purchasing information pertaining to the selected registered consumer from the consumer data structure to complete a purchasing transaction.

16. The system in accordance with claim 15, wherein the consumer information server software further comprises instructions to select the purchasing information for a selected registered consumer that is acceptable to the merchant based on the merchant information in the merchant data structure.

17. The system in accordance with claim 16, wherein the consumer information server software further comprises instructions to gather the purchasing information to complete a purchasing transaction by prompting the registered consumer for additional purchasing information to complete a transaction if the consumer data structure is missing purchasing information to complete the purchasing transaction.

18. The system in accordance with claim 13, wherein the consumer information server software further comprises instructions to gather the purchasing information to complete a purchasing transaction by prompting the consumer for the purchasing information when the consumer is a non-registered consumer.

19. The system in accordance with claim 14, wherein the consumer information server software further comprises instructions to allow a registered consumer to enter information to identify the registered consumer thereby allowing the consumer information server software to access the registered consumer's information stored in the consumer data structure if the consumer information server software did not select the correct registered consumer.

20. The system in accordance with claim 19, wherein the information which can be entered to identify the registered consumer comprises a consumer identification number, email address, and a passphrase.

21. The system in accordance with claim 14, wherein the consumer information server software further comprises instructions to allow a registered consumer to enter information to identify the registered consumer thereby allowing the consumer information server software to access the registered consumer's information stored in the consumer data structure if the registered consumer was not associated with the consumer's web browser.

22. The system in accordance with claim 21, wherein the information which can be entered to identify the registered consumer comprises a consumer identification number, email address, and a passphrase.

23. The system in accordance with claim 14, wherein the consumer information server software further comprises instructions to prompt the selected consumer for the consumer's identification number and passphrase if the registered consumer was selected by the consumer information server software.

24. The system in accordance with claim 18, wherein the system further comprises a temporary data structure for storing for a limited amount of time purchasing information pertaining to a purchasing transaction.

25. The system in accordance with claim 1, wherein the merchant's offer comprises a merchant identifier, a price for the item, a digital signature of the merchant, and a transaction number.

26. The system in accordance with claim 25, wherein the merchant's offer further comprises a final price indicator which indicates that the price for an item is not final.

27. The system in accordance with claim 26, wherein the consumer information server software further comprises instructions which communicate the consumer's shipping address information to the merchant computer for calculating the final price for the item if the final price indicator indicates that the price for an item is not final.

28. The system in accordance with claim 27, wherein the consumer's shipping address information communicated to the merchant further comprises the city, state, country and mail code of the consumer's shipping address.

29. The system in accordance with claim 27, wherein the merchant computer further comprises instructions for calculating the final price for the item being purchased based on the consumer's shipping address information.

30. The system in accordance with claim 27, wherein the consumer's shipping address information communicated to the merchant further comprises the shipping means.

31. The system in accordance with claim 30, wherein the merchant computer further comprises instructions for calculating the final price for the item being purchased based on the consumer's shipping address information.

32. The system in accordance with claim 27, wherein the consumer's shipping address is the email address where the item is being sent for items which can be delivered over the network.

33. The system in accordance with claim 18, wherein the consumer information server software further comprises instructions to set a flag if a non-registered consumer elects to become a registered consumer.

34. The system in accordance with claim 33, wherein the consumer information server software further comprises instructions to prompt a non-registered consumer for registration information if the flag is set indicating that a non-registered consumer elected to become a registered consumer.

35. The system in accordance with claim 34, wherein the consumer information server software further comprises instructions to transfer the information stored in the temporary data structure to the consumer data structure when a non-registered consumer elects to become a registered consumer.

36. The system in accordance with claim 1, wherein the system further comprises a consumer transaction log for recording information relating to a registered consumer's purchasing transactions, wherein a registered consumer is a consumer who has previously registered with the system.

37. The system in accordance with claim 36, wherein the consumer information server further comprises storage for storing the consumer transaction log.

38. The system in accordance with claim 36, further comprising at least one server to store the consumer transaction log.

39. The system in accordance with claim 1, further comprising a merchant transaction log which stores label-value pairs relating to transactions performed by the at least one merchant.

40. The system in accordance with claim 39, wherein the consumer information server further comprises storage for storing the merchant transaction log.

41. The system in accordance with claim 39, further comprising at least one server for storing the merchant transaction log.

42. A method for merchant invoked electronic commerce over a network between at least one consumer having at least one consumer computer connected to the network, at least merchant having at least one merchant computer connected to the network, and at least one consumer information server connected to the network, wherein the method comprises: requesting a merchant's offer from at least one merchant over a network by at least one consumer using a web browser on at least one consumer computer; invoking client software on the at least one merchant computer in response to the consumer's request for a merchant's offer, and wherein invoking the client software further comprises:

connecting the at least one consumer computer to the at least one consumer information server;

invoking the consumer information server software;

forwarding the merchant's offer to the least one consumer information server; and gathering the purchasing information by the consumer information server to complete a purchasing transaction.

43. The method in accordance with claim 42, further comprising sending the purchasing information to the at least one merchant computer.

44. The method in accordance with claim 42, further comprising the client software instructing the consumer web browser to forward the merchant's offer to the consumer information server and sending a message indicating whether a browser identifier is present in the consumer's web browser.

45. The method in accordance with claim 44, wherein the sending of a message indicating whether a browser identifier is present in the consumer's web browser further comprises the client software instructing the web browser to forward a message and wherein the browser identifier is a cookie.

46. The method in accordance with claim 44, further comprising selecting a registered consumer if the browser identifier indicates a plurality of registered consumers who have used the consumer's web browser, and wherein a registered consumer is a consumer who has previously registered with the system.

47. The method in accordance with claim 46, further comprising accessing a merchant data structure to determine the purchasing information the at least one merchant requires to complete a purchasing transaction.

48. The method in accordance with claim 47, further comprising accessing a consumer data structure to gather the purchasing information the at least one merchant requires to complete a purchasing transaction.

49. The method in accordance with claim 48, further comprising prompting the registered consumer for additional purchasing information to complete a purchasing transaction if the consumer data structure is missing purchasing information which is necessary for the at least one merchant to complete a purchasing transaction.

50. The method in accordance with claim 42, further comprising prompting the consumer for the purchasing information when the consumer is a non-registered consumer.

51. The method in accordance with claim 48, fer comprising a registered consumer entering identifying information to allow a registered consumer to identify the registered consumer thereby allowing the consumer information server software to access the registered consumer's information from the consumer data structure if the consumer information server software did not select the registered consumer.

52. The method in accordance with claim 51, wherein entering the identifying information further comprises a consumer entering the consumer's identification number, email address, and a passphrase.

53. The method in accordance with claim 48, further comprising a registered consumer entering identifying information to allow a registered consumer to identify the registered consumer thereby allowing the consumer information server software to access the registered consumer's information from the consumer data structure if the registered consumer is not associated with the consumer's web browser.

54. The method in accordance with claim 53, wherein entering the identifying information further comprises a consumer entering the consumer's identification number, email address, and a passphrase.

55. The method in accordance with claim 48, further comprising prompting the selected registered consumer to enter the consumer's identification number and passphrase when the registered consumer was selected by the consumer information server software.

56. The method in accordance with claim 50, further comprising storing the consumer's purchasing information in a temporary data structure when the consumer is a non registered consumer.

57. The method in accordance with claim 56, further comprising transferring the consumer's purchasing information from the temporary data structure when a non-registered consumer elects to become a registered consumer.

58. The method in accordance with claim 48, further comprising sending the consumer's shipping address information to the merchant computer when a final price indicator in the merchant's offer indicates that the price for an item is not final.

59. The method in accordance with claim 58, wherein sending the consumer's shipping address further comprises sending the consumer's city, state, country and mail code.

60. The method in accordance with claim 58, further comprising the merchant computer calculating a final price based on the consumer's shipping address.

61. The method in accordance with claim 42, further comprising recording information relating to a registered consumer's purchasing transactions, wherein a registered consumer is a consumer who has previously registered with the system.

62. The method in accordance with claim 42, further comprising recording label-value pairs relating to transactions performed by the at least one merchant.

63. A system for merchant invoked electronic commerce for gathering information to complete a purchasing transaction comprising:

a network;

at least one consumer computer for operation by a consumer desiring to purchase an item;

at least one merchant computer; and at least one consumer information server;

said consumer computer, merchant computer and consumer information server being interconnected by the network;

said merchant computer being programmed to receive a consumer's request for a merchant's offer to purchase an item, and to cause a merchant's offer further comprising a transaction number associated with the merchant offer to be sent to the consumer;

said consumer information server being programmed to receive the transaction number and to gather and send the purchasing information to the merchant computer to complete the purchasing transaction; and said merchant computer being further programmed to process the purchasing information to complete the purchasing transaction.

64. A system for accessor invoked software to allow the electronic delivery of information comprising:

an accessee computer associated with at least one accessee and connected to the network, wherein the accessee computer further comprises a web browser which allows the accessee to access and communicate over the network;

an accessor computer associated with at least one accessor and connected to the network, wherein the accessor computer further comprises web server software which operates a web page and client software which allows the at least one accessor to send and receive information;

at least one information server connected to the accessee computer via the network and to the accessor computer via the network, wherein the at least one information server further comprises information server software for gathering the purchasing information to complete a transaction, wherein when the at least one accessee makes a data request from the accessor, the client software is initiated thereby connecting the accessee computer to the at least one information server and forwards the accessee's data requests to the at least one information server via the accessee's web browser wherein the information server software gathers the data request information to complete the data request.

65. The system in accordance with claim 64, wherein the information server software further comprises instructions to send the data request information to the accessor for processing.

66. The system in accordance with claim 64 wherein the network is selected from group consisting of the Internet, intranet, local area networks (LANS), and wide area networks (WANS).

67. The system in accordance with claim 64, wherein the client software further comprises instructions for instructing the accessee web browser to forward the accessor's data request to the at least one information server and to send a message to the information server indicating whether a browser identifier is present in the accessee's web browser, and wherein the presence of a browser identifier indicates whether the accessee's web browser was previously used in conjunction with the system.

68. The system in accordance with claim 67, wherein the browser identifier is a cookie.

69. The system in accordance with claim 67, further comprising an accessee data structure which further comprises information pertaining to previous transactions by at least one registered accessee, and wherein a registered accessee is an accessee who has previously registered with the system.

70. The system in accordance with claim 69, wherein the information server further comprises storage for storing the accessee data structure.

71. The system in accordance with claim 69, wherein the system further comprises at least one server for storing the accessee data structure.

72. The system in accordance with claim 67, wherein the system further comprises an accessor data structure which further comprises label-value pairs which represent accessor information that is necessary to identify the accessor and the accessor computer.

73. The system in accordance with claim 72, wherein the accessor information further comprises contact information, accessor identification number, and at least one network location for the accessor computer.

74. The system in accordance with claim 72, wherein the information server further comprises storage for storing the accessor data structure.

75. The system in accordance with claim 72, wherein the system further comprises at least one server for storing the accessor data structure.

76. The system in accordance with claim 67, further comprising:
an accessee data structure which further comprises information pertaining to previous purchasing transactions by at least one registered accessee, wherein a registered accessee is an accessee who has previously registered with the system and
an accessor data structure which further comprises label-value pairs which represent accessor information that is necessary to identify the accessor and the accessor computer.

77. The system in accordance with claim 76, wherein the information server software further comprises instructions to select an accessee if the browser identifier identifies one or more registered accessees who have used the accessee's web browser in conjunction with the system.

78. The system in accordance with claim 77, wherein the information server software further comprises instructions to gather the data request information pertaining to the selected registered accessee from the accessee data structure to complete a transaction.

79. The system in accordance with claim 78, wherein the information server software further comprises instructions to select the data request information for a selected registered accessee that is acceptable to the accessor based on the accessor information in the accessor data structure.

80. The system in accordance with claim 79, wherein the information server software further comprises instructions to gather the data request information to complete a transaction by prompting the registered accessee for additional data request information necessary to complete a transaction if the accessee data structure is missing data request information necessary to complete the transaction.

81. The system in accordance with claim 76, wherein the information server software further comprises instructions to gather the data request information to complete a transaction by prompting the accessee for the necessary data request information when the accessee is a non-registered accessee.

82. The system in accordance with claim 77, wherein the information server software further comprises instructions to allow a registered accessee to enter information to identify the registered accessee thereby allowing the information server software to access the registered accessee's information stored in the accessee data structure if the information server software did not select the correct registered accessee.

83. The system in accordance with claim 82, wherein the information which can be entered to identify the registered accessee comprises an accessee identification number, email address, and a passphrase.

84. The system in accordance with claim 77, wherein the information server software further comprises instructions to allow a registered accessee to enter information to identify the registered accessee thereby allowing the information server software to access the registered accessee's information stored in the accessee data structure if the registered accessee was not associated with the accessee's web browser.

85. The system in accordance with claim 84, wherein the information which can be entered to identify the registered accessee comprises an accessee identification number, email address, and a passphrase.

86. The system in accordance with claim 77, wherein the information server software further comprises instructions to prompt the selected accessee for the accessee's identification number and passphrase if the registered accessee was selected by the information server software.

87. The system in accordance with claim 81, wherein the system further comprises a temporary data structure for storing for a limited amount of time data request information pertaining to a transaction.

88. The system in accordance with claim 65, wherein the accessee's data request comprises an accessor id, a digital signature of the accessor, and a transaction number.

89. The system in accordance with claim 81, wherein the information server software further comprises instructions to set a flag if a non-registered accessee elects to become a registered accessee.

90. The system in accordance with claim 89, wherein the information server software further comprises instructions to prompt a non-registered accessee for registration information if the flag is set indicating that a non-registered accessee elected to become a registered accessee.

91. The system in accordance with claim 90, wherein the information server software further comprises instructions to transfer the information stored in the temporary data structure to the accessee data structure when a non-registered accessee elects to become a registered accessee.

92. The system in accordance with claim 65, wherein the system further comprises an accessee transaction log for recording information relating to a registered accessee's transactions, wherein a registered accessee is an accessee who has previously registered with the system.

93. The system in accordance with claim 92, wherein the information server further comprises storage for storing the accessee transaction log.

94. The system in accordance with claim 92, further comprising at least one server to store the accessee transaction log.

95. The system in accordance with claim 65, further comprising an accessor transaction log which stores label-value pairs relating to transactions performed by the at least one accessor.

96. The system in accordance with claim 95, wherein the information server further comprises storage for storing the accessor transaction log.

97. The system in accordance with claim 95, further comprising at least one server for storing the accessor transaction log.

98. The system in accordance with claim 65, wherein the accessee is a potential mortgage borrower and the accessor is a mortgage lender.

99. The system in accordance with claim 98, wherein the data request information further comprises the information necessary for the mortgage lender to make a decision on whether to lend money to a borrower.

100. The system in accordance with claim 65, wherein the accessee is a potential student and the accessor is an educational institution.

101. The system in accordance with claim 100, wherein the data request information further comprises the information necessary for the educational institution to make a decision on whether to enroll a potential student at the educational institution.

102. A method for accessor invoked software to allow the electronic delivery of information over a network between at least one accessee having at least one accessee computer connected to the network, at least one accessor having at least one accessor computer connected to the network, and at least one information server connected to the network, wherein the method comprises:
  requesting a data request from at least one accessor over a network by at least one accessee using a web browser on at least one accessee computer;
  invoking client software on the at least one accessor computer in response to the accessee's request for a accessor's offer, and wherein invoking the client software further comprises:
    connecting the at least one accessee computer to the at least one information server;
    invoking the information server software;
    forwarding the accessor's offer to the least one information server; and
  gathering the purchasing information by the information server to complete a purchasing transaction.

103. The method in accordance with claim 102, further comprising sending the purchasing information to the at least one accessor computer.

104. The method in accordance with claim 102, further comprising the client software instructing the accessee web browser to forward the accessor's data request to the information server and sending a message indicating whether a browser identifier is present in the accessee's web browser.

105. The method in accordance with claim 104, wherein the sending of a message indicating whether a browser identifier is present in the accessee's web browser further comprises the client software instructing the web browser to forward a message and wherein the browser identifier is a cookie.

106. The method in accordance with claim 104, further comprising selecting a registered accessee if the browser identifier indicates a plurality of registered accessees who have used the accessee's web browser, and wherein a registered accessee is a accessee who has previously registered with the system.

107. The method in accordance with claim 106, further comprising accessing an accessor data structure to determine the data request information the at least one accessor requires to complete a transaction.

108. The method in accordance with claim 107, further comprising accessing an accessee data structure to gather the necessary data request information the at least one accessor requires to complete a transaction.

109. The method in accordance with claim 108, further comprising prompting the registered accessee for additional data request information to complete a transaction if the accessee data structure is missing data request information which is necessary for the at least one accessor to complete a transaction.

110. The method in accordance with claim 102, further comprising prompting the accessee for the necessary data request information when the accessee is a non-registered accessee.

111. The method in accordance with claim 108, further comprising a registered accessee entering identifying information to allow a registered accessee to identify the registered accessee thereby allowing the information server software to access the registered accessee's information from the accessee data structure if the information server software did not select the registered accessee.

112. The method in accordance with claim 111, wherein entering the identifying information further comprises the accessee entering the accessee's identification number, email address, and a passphrase.

113. The method in accordance with claim 108, further comprising a registered accessee entering identifying information to allow a registered accessee to identify the registered accessee thereby allowing the information server software to access the registered accessee's information from the accessee data structure if the registered accessee is not associated with the accessee's web browser.

114. The method in accordance with claim 113, wherein entering the identifying information further comprises the accessee entering the accessee's identification number, email address, and a passphrase.

115. The method in accordance with claim 111, further comprising prompting the selected registered accessee to enter the accessee's identification number and passphrase when the registered accessee was selected by the information server software.

116. The method in accordance with claim 110, further comprising storing the accessee's data request information in a temporary data structure when the accessee is a non-registered accessee.

117. The method in accordance with claim 116, further comprising transferring the accessee's data request information from the temporary data structure when a non-registered accessee elects to become a registered accessee.

118. The method in accordance with claim 102, further comprising recording information relating to a registered accessee's transactions, wherein a registered accessee is an accessee who has previously registered with the system.

119. The method in accordance with claim 102, farther comprising recording label-value pairs relating to transactions performed by the at least one accessor.

120. The system in accordance with claim 17, wherein the prompting of the registered consumer is presented with a brand.

121. The system in accordance with claim 120, wherein the brand is the merchant's brand.

122. The system in accordance with claim 18, wherein the prompting of the non-registered consumer is presented with a brand.

123. The system in accordance with claim 122, wherein the brand is the merchant's brand.

* * * * *

UNITED STATES PATENT AND TRADEMARK OFFICE
CERTIFICATE OF CORRECTION

| | | |
|---|---|---|
| PATENT NO. | : 6,092,053 | Page 1 of 1 |
| APPLICATION NO. | : 09/167873 | |
| DATED | : July 18, 2000 | |
| INVENTOR(S) | : Boesch et al. | |

It is certified that error appears in the above-identified patent and that said Letters Patent is hereby corrected as shown below:

| Column | Line | |
|---|---|---|
| Title Page | # 73 | Change "CyberCash, Inc., Reston, VA" to --Verisign, Inc., Mountain View, CA-- |
| Claim 1 | 50 | Change "fer" to --further-- |
| Claim 51 | 38 | Change "fer" to --further-- |

Signed and Sealed this

Second Day of January, 2007

JON W. DUDAS
*Director of the United States Patent and Trademark Office*